United States Patent [19]

Tanimoto et al.

[11] Patent Number: 5,228,786
[45] Date of Patent: Jul. 20, 1993

[54] FULL TYPE BALL BEARING FOR TURBOCHARGERS

[75] Inventors: Kiyoshi Tanimoto; Hiroaki Takebayashi; Kazuo Rokkaku, all of Osaka, Japan

[73] Assignee: Koyo Seiko Co., Ltd., Osaka, Japan

[21] Appl. No.: 870,175

[22] Filed: Apr. 16, 1992

Related U.S. Application Data

[63] Continuation-in-part of Ser. No. 711,416, Jun. 5, 1991, abandoned, which is a continuation-in-part of Ser. No. 494,842, Mar. 14, 1990, abandoned, and a continuation of Ser. No. 283,718, Dec. 13, 1988, abandoned.

[30] Foreign Application Priority Data

Dec. 15, 1987 [JP] Japan ............................ 62-317052

[51] Int. Cl.$^5$ .............................................. F16C 33/62
[52] U.S. Cl. .................................... 384/492; 384/513; 384/907.1
[58] Field of Search .................... 384/492, 491, 907.1, 384/517, 518, 513, 514, 516, 493

[56] References Cited

U.S. PATENT DOCUMENTS

| | | | |
|---|---|---|---|
| 1,332,176 | 2/1920 | Heindlhofer | 384/492 |
| 3,097,897 | 7/1963 | Taylor | 384/492 |
| 4,634,300 | 1/1987 | Takebayashi et al. | 384/492 X |
| 4,721,441 | 1/1988 | Miyashita et al. | 384/518 X |
| 4,789,253 | 12/1988 | Perego | 384/517 |
| 4,799,810 | 1/1989 | Gilbert | 384/492 X |

OTHER PUBLICATIONS

Deutschman et al *Machine Design Theory and Practice*, pp. 445–459, Dec. 1975.
"Development of High-Efficiency Ball-Bearing Turbocharger", by Miyashita et al, pp. 1–6, with partial English translation thereof.
"Performance of Ceramic Bearings in High Speed Turbine Application", by Takebayashi, SAE, Pa. Sep. 1990.
Koyo Engineering Journal, No. 139, Mar. 1991.

*Primary Examiner*—Thomas R. Hannon
*Attorney, Agent, or Firm*—Armstrong, Westerman, Hattori, McLeland & Maughton

[57] ABSTRACT

A full type ball bearing for turbochargers comprising an inner ring and an outer ring both made of steel and balls made of a ceramic.

20 Claims, 4 Drawing Sheets

FULL TYPE BALL BEARING FOR TURBOCHARGERS

This application is a continuation-in-part of application Ser. No. 711,416 filed Jun. 5, 1991 now abandoned which is a continuation-in-part of Ser. No. 494,842, filed Mar. 14, 1990 now abandoned and a continuation of Ser. No. 283,718 filed Dec. 13, 1988 now abandoned.

BACKGROUND OF THE INVENTION

The present invention relates to a full type ball bearing for turbochargers for motor vehicle engines, etc.

With turbochargers, for example, for motor vehicle engines, investigations are under way for a change-over from the floating bearing employing floating metal and presently in use to the ball bearing (antifriction bearing) mainly for the purpose of improving the responsiveness in the range of low speeds.

Since turbochargers are used at a high temperature, under a great load and at a high speed of rotation, common ball bearings comprising inner and outer rings, balls and a retainer, if incorporated therein, encounter the problem of a shortened life. During the rise to a high speed, especially, lubrication of the retainer portion poses a problem, leading to a failure of the bearing in a short period of time. To overcome the problem encountered with the retainer portion, there is a need to finish the retainer with high precision or to subject the retainer to a special treatment such as silver plating. Accordingly, full type ball bearings appear useful for turbochargers, whereas with the conventional full type ball bearing wherein the balls are made of steel, the contact between the balls involves slippage because the balls move in directions totally opposite to each other, entailing depletion of the lubricant and leading to an early failure of the bearing. For this reason, the full type ball bearing is not in use although the bearing is thought favorable for use in turbochargers.

SUMMARY OF THE INVENTION

The main object of the present invention is to overcome the foregoing problems and to provide a full type ball bearing which is highly responsive and has a prolonged life for use in turbochargers.

The full type ball bearing of the invention for turbochargers is characterized in that the bearing comprises an inner ring and an outer ring both made of steel, and ceramic balls.

Being a full type ball bearing, the bearing of the invention is free of the problem of a shortened life due to the presence of the retainer incorporated in common ball bearings. Moreover, the present bearing has a 20 to 30% greater number of balls than such common bearings and therefore has a greater load rating and prolonged fatigue life. The balls, which are made of a ceramic, can be in contact with one another with reduced friction, which is favorable in the event of depletion of lubricant, consequently rendering the bearing operable free of seizure and giving a prolonged life to the bearing. The ceramic having a smaller density than steel decreases the moment of inertia involved, reduces the centrifugal force acting on the outer ring, and therefore provides a smaller contact angle on the inner ring which results in diminished slippage, giving improved responsiveness to the turbocharger.

Thus, the full type ball bearing of the present invention is highly responsive and free of seizure and has a prolonged life.

DESCRIPTION OF THE PREFERRED EMBODIMENT

Figure 1:
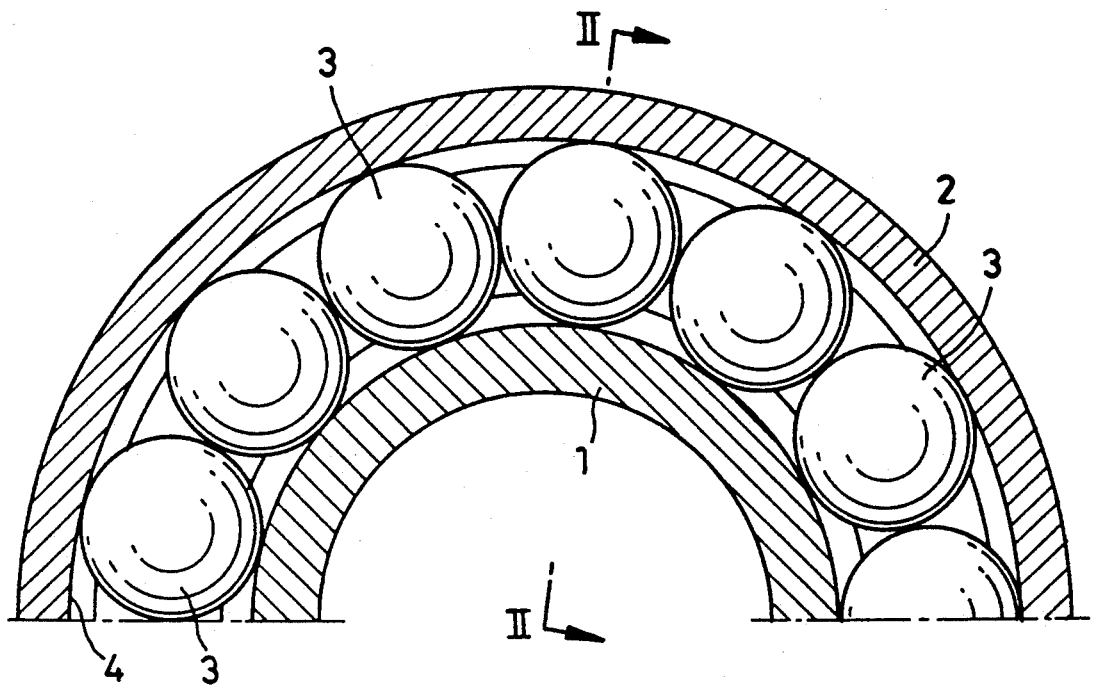
FIG. 1 is a fragmentary view in cross section of a full type ball bearing embodying the invention for use in turbochargers.
Figure 2:
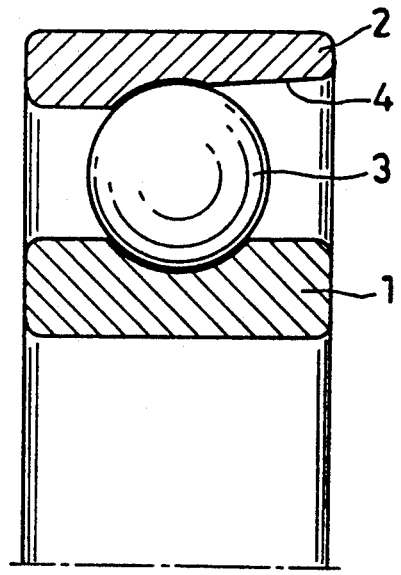
FIG. 2 is a view in section taken along the line II—II in FIG. 1.

FIGS. 1 and 2 show a full type ball bearing embodying the invention for use in turbochargers.

The bearing is a single-row angular-contact ball bearing comprising an inner ring 1 and an outer ring 2 both made of steel, such as AISI M50 (high speed steel), and balls 3 made of a ceramic such as silicon nitride (3.2 in density). The outer ring 2 has a counterbore 4. The inner and outer rings have inner and outer raceway grooves, respectively, formed on them.

The bearing can be dimensioned suitably. When the bearing is of the JIS 7001CA type, the main portions have, for example, the following dimensions. The bearing is 12 mm in inside diameter, 28 mm in outside diameter and 8 mm in width. The shoulder portion of the inner ring 1 has a wall thickness of 2.6 mm, which is larger than the wall thickness, 2.0 mm, of the shoulder portion of the outer ring 2. The wall thickness of inner ring 1 outside of the inner raceway groove is even relative to the inner ring's longitudinal centerline. The balls 3 are 13 in number and 4.7625 mm in diameter. The balls 3 sit within the inner and outer raceway grooves when fitted between the inner and outer rings. The circumferential clearance of the bearing is 0.2 to 0.8 times the diameter of the ball 3. The circle through the centers of the balls 3, i.e. the pitch circle, has a diameter (PCD) which is so adjusted that the circumferential clearance has a value in the above range. Since the inner ring 1 has a larger wall thickness than the outer ring 2 as stated above, the PCD is greater than the average of the bearing inside diameter and outside diameter.

The inner ring 1 of increased wall thickness has the advantage that the expansion of the inner ring 1 due to the centrifugal force can be smaller. The increased PCD is likely to permit the use of one more ball, resulting in a corresponding increase in the load rating to lengthen the fatigue life. Since the bearing is a full type ball bearing without any retainer, lubricant can be supplied to the raceways easily, while the counterbore 4 formed in the outer ring 2 readily permits escape of the lubricant, assuring smooth circulation of the lubricant to inhibit the rise of temperature.

Figure 3:
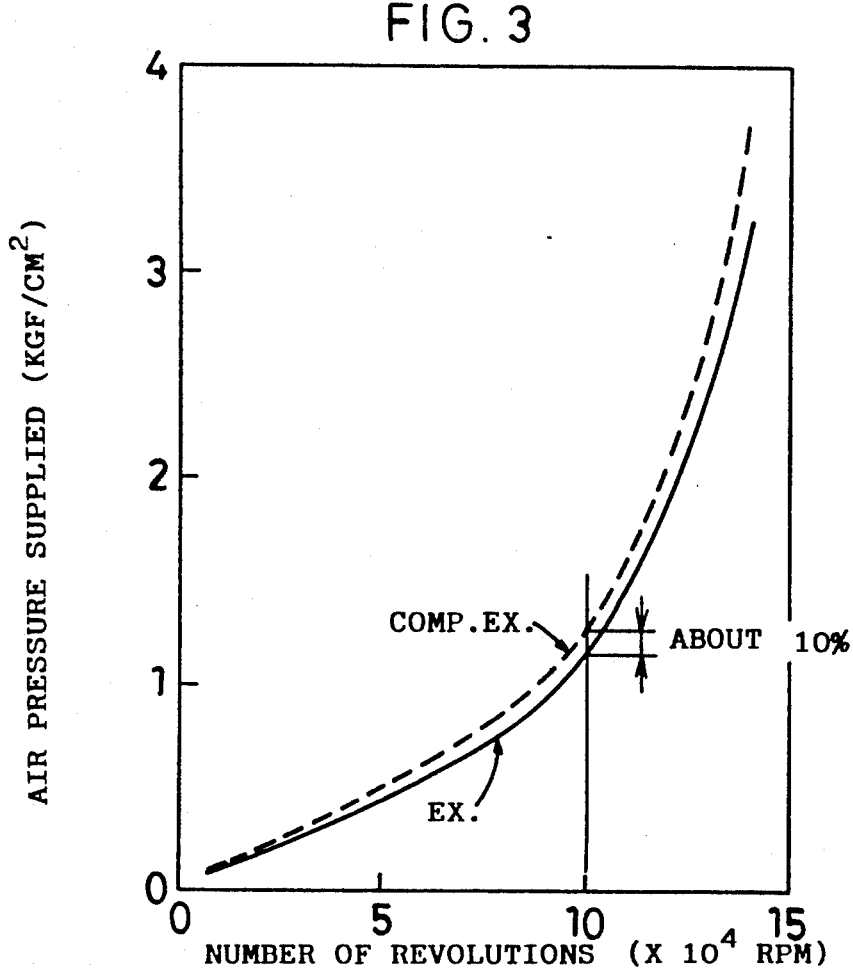
FIG. 3 is a graph showing the result of a first test conducted for an example and a comparative example to establish the relationship between the air pressure supplied to a turbocharger and the number of revolutions of the bearing.
Figure 4:
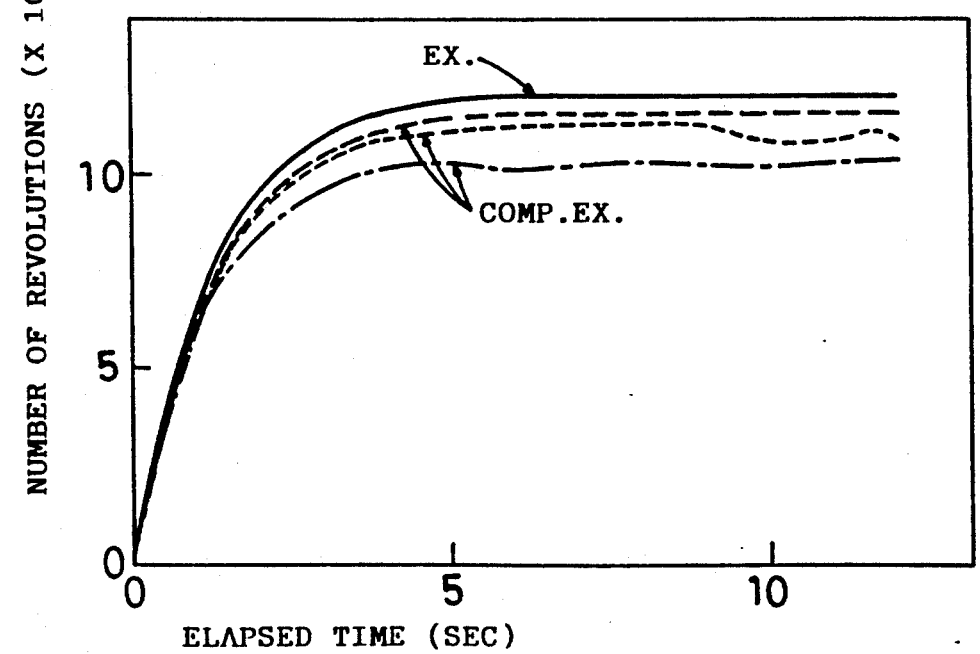
FIG. 4 is a graph showing the result of a first test conducted for the example and the comparative example to establish the relationship between the elapsed time and the number of revolutions of the bearing during rapid acceleration.
Figure 5:
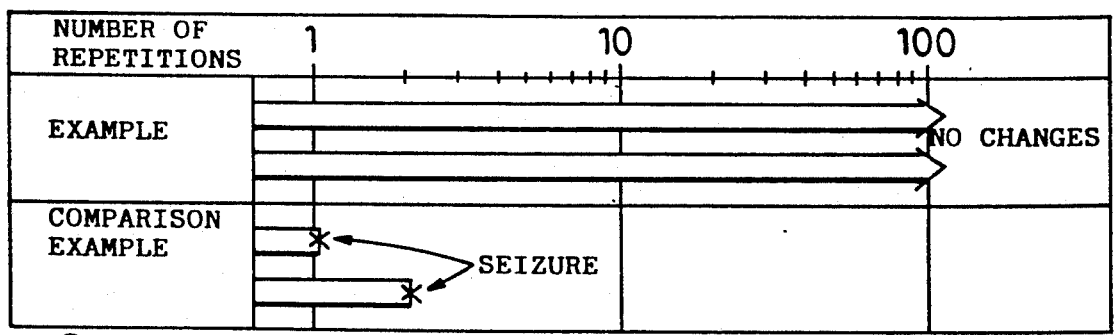
FIG. 5 is a graph showing the result of a rapid acceleration repetition test conducted for the example and the comparative example by repeatedly stopping and rapidly accelerating the bearing.
Figure 8:
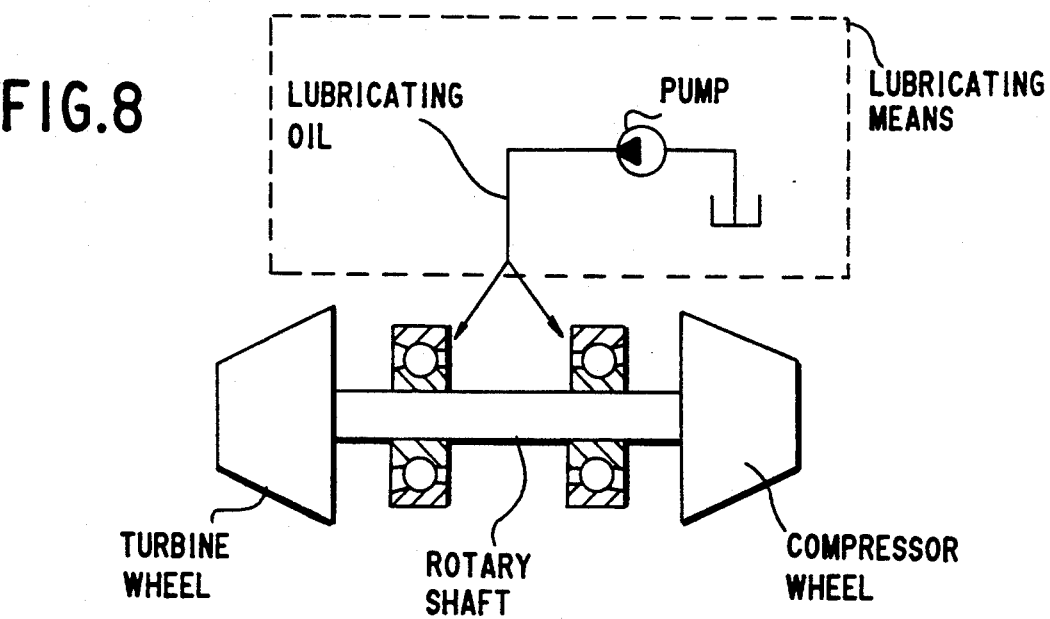
FIG. 8 is a diagram illustrating the structural relationship between the full-type ball bearings used in the first performance test and a conventional oil jet device providing lubrication.

FIGS. 3 to 5 show the results of first comparative performance tests conducted for the full type ball bearing of the invention shown in FIGS. 1 and 2 (example) and a conventional full type ball bearing which is identical with the example in configuration and in which the inner and outer rings and the balls are all made of steel (comparative example). FIG. 8 illustrates the structural relationship between the bearings and the oil jet device used for providing lubrication. The bearings are of the 7001CA type. The inner and outer rings of the example bearing are made of AISI M50, and the balls thereof are made of silicon nitride. The comparative example bearing is wholly made of AISI M50. The test conditions are as follows.

| Number of revolutions: | 0 to 140,000 r.p.m. |
| --- | --- |
| Axial load: | 12 to 40 kgf |
| Temperature: | room temperature |
| Lubrication | |
| Method: | oil mist (1 cc/mm, 4 kg/cm$^2$) |
| Lubricant: | Velocity No. 6 (brand name) |
| Kinematic viscosity: | 30 m$^2$/s (20° C.) |

FIG. 3 is a graph showing the result obtained by testing the bearings for the relationship between the air pressure supplied to a turbocharger and the number of revolutions of the bearing. The example is represented by a solid line, and the comparative example by a broken line. It is seen that the bearing of the example can be rotated at high speeds at a lower pressure than the bearing of the comparative example.

FIG. 4 is a graph showing the result obtained by testing the bearings for rapid acceleration characteristics, i.e. for the relationship between the elapsed time and the number of revolutions of the bearing during rapid acceleration. The graph reveals that the bearing of the comparative example behaves unstably during rapid acceleration unlike the bearing of the example and is lower in speed.

FIG. 5 is a graph showing the result obtained by testing the bearings for repeated rapid acceleration, i.e. by repeatedly stopping and rapidly accelerating the bearings. The bearing samples of the comparative example became inoperative due to seizure when subjected to the stopping-acceleration cycle several times, whereas those of the example remained free of abnormalities even when the cycle was repeated 100 times continually.

Figure 6:
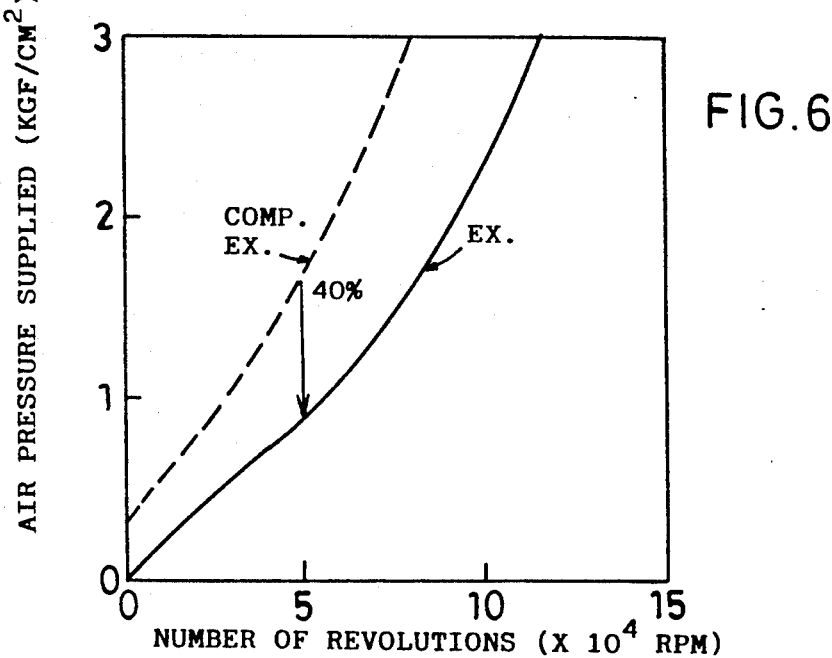
FIG. 6 is a graph showing the result of a second test conducted for the example and the comparative example to establish the relationship between the air pressure supplied to the turbocharger and the number of revolutions of the bearing.
Figure 7:
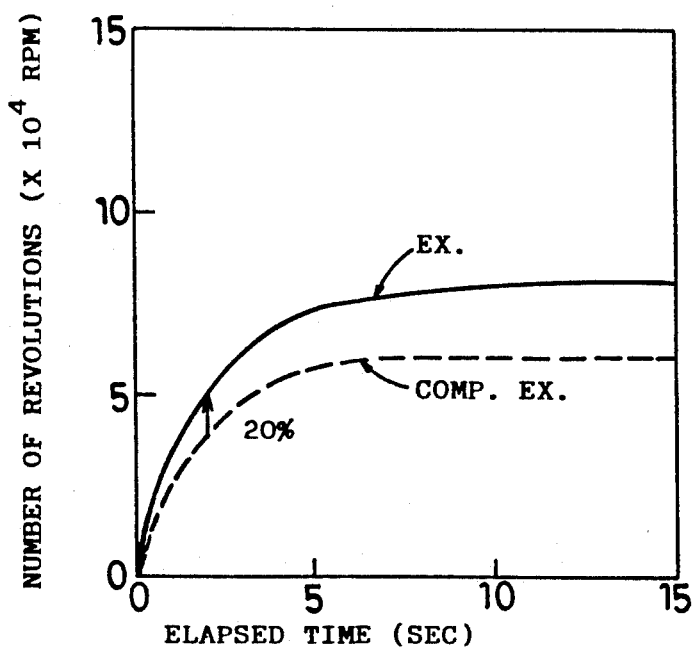
FIG. 7 is a graph showing the result of a second test conducted for the example and the comparative example to establish the relationship between the elapsed time and the number of revolutions of the bearing during rapid acceleration.
Figure 9:
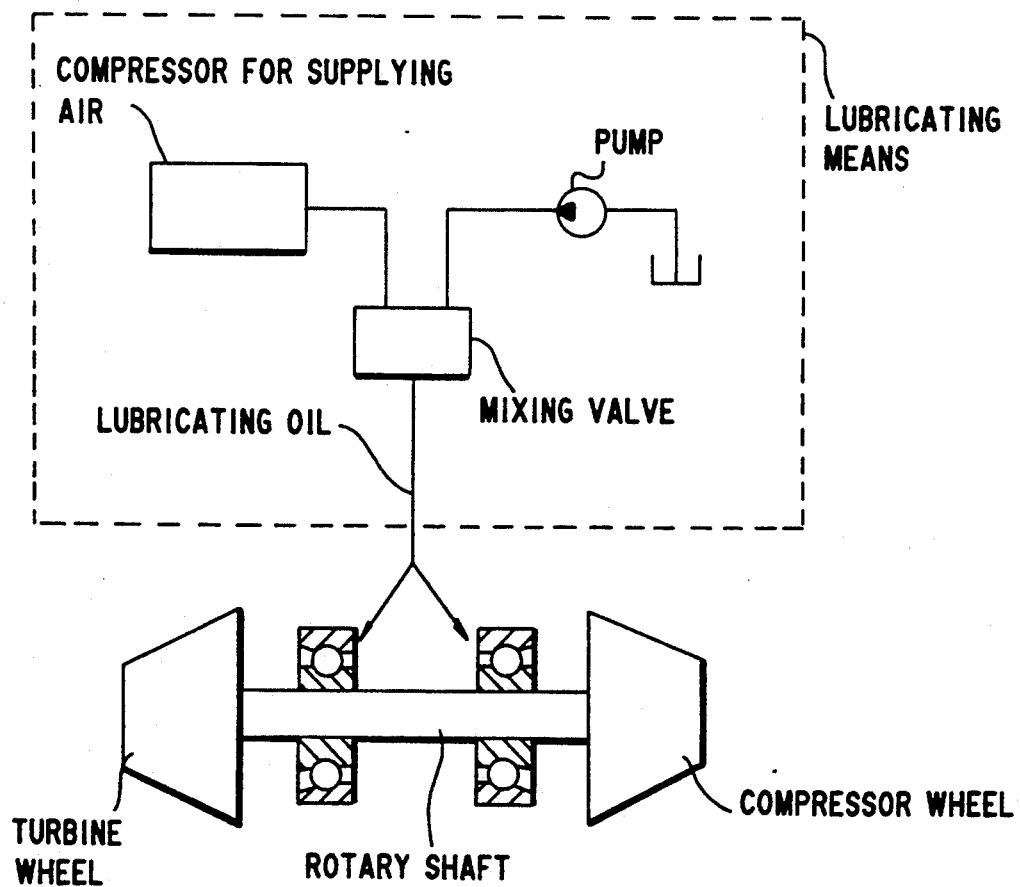
FIG. 9 is a diagram illustrating the structural relationship between the full-type ball bearings used in the second performance test and a conventional oil mist device providing lubrication.

FIGS. 6 and 7 show the results of second performance tests conducted for the example and the comparative example. The second tests are different from the first only in the test conditions as to the axial load and the method of lubrication as shown below. FIG. 9 illustrates the structural relationship between the bearings and the oil mist device used for providing lubrication.

| Axial load: | 80 kgf |
| --- | --- |
| Lubrication method: | oil jet |
| | example: 0.05 liter/min |
| | comp. ex.: 2.5 liters/min |

FIG. 6 corresponds to FIG. 3, and FIG. 7 to FIG. 4.

The results given in FIGS. 6 and 7 reveal the following. First, the bearing of the example is usable free of troubles even if the amount of lubricant applied thereto is as small as about 1/50 of the amount used for the comparative bearing. Despite the diminished lubrication, the example bearing is rotatable at high speeds at a lower supply pressure than the comparative bearing and can be rapidly accelerated to a higher speed than the comparative bearing.

Beside silicon nitride mentioned, other ceramics of low density (up to 4) are advantageously usable for the balls of the full type ball bearing for turbochargers. Such ceramics include sialon (3.2 in density), silicon carbide (3.2 in density) and alumina (3.9 in density).

What is claimed is:

1. A full type ball bearing lubricated by an oil jet for turbochargers used in motor vehicle engines, being an angular-contact type and comprising:

a raceway having an inner ring and an outer ring both made of steel, a wall thickness of said inner ring being larger than a wall thickness of said outer ring;

a plurality of balls interposed between the rings and made of a ceramic; and a counterbore formed at least in the outer ring.

2. A full type ball bearing as defined in claim 1 wherein the ceramic forming the balls is selected from the group consisting of silicon nitride, sialon, silicon carbide and alumina.

3. A full type ball bearing as defined in claim 1, wherein said raceway is made of high-speed steel and said balls are composed of silicon nitride.

4. A full type ball bearing as defined in claim 1, wherein said ceramic has a density substantially less than that of steel.

5. A full type ball bearing as defined in claim 1, wherein said balls are positioned in said raceway with a ratio of circumferential clearance to ball diameter in the range of 0.2 to 0.8.

6. A full-type ball bearing according to claim 1, wherein inner and outer raceway grooves are formed on the inner and outer rings, respectively, and a thickness of the inner ring of said raceway outside of the inner raceway groove is even relative to a longitudinal centerline of the inner ring.

7. A full type ball bearing lubricated by an oil mist for turbochargers used in motor vehicle engines, being an angular-contact type and comprising:

a raceway having an inner ring and an outer ring both made of steel, a wall thickness of said inner ring being larger than a wall thickness of said outer ring;

a plurality of balls interposed between the rings and made of a ceramic; and a counterbore formed at least in the outer ring.

8. A full type ball bearing as defined in claim 7, wherein the ceramic forming the balls is selected from the group consisting of silicon nitride, sialon, silicon carbide and alumina.

9. A full type ball bearing as defined in claim 7, wherein said raceway is made of high-speed steel and said balls are made of silicon nitride.

10. A full type ball bearing as defined in claim 7, wherein said ceramic has a density substantially less than that of steel.

11. A full type ball bearing as defined in claim 7, wherein said balls are positioned in said raceway with a ratio of circumferential clearance to ball diameter in the range of 0.2 to 0.8.

12. A full-type ball bearing according to claim 7, wherein inner and outer raceway grooves are formed on the inner and outer rings, respectively, and a thickness of the inner ring of said raceway outside of the inner raceway groove is even relative to a longitudinal centerline of the inner ring.

13. A ball bearing system for turbochargers used in motor vehicle engines, comprising:
- a full-type, angular-contact ball bearing having a raceway which includes an inner ring and an outer ring both made of steel, a plurality of balls interposed between the rings and made of ceramic, and a counterbore formed at least in the outer ring, a wall thickness of the inner ring of said ball bearing being larger than a wall thickness of the outer ring; and
- a lubricating means for lubricating said full-type, angular-contact ball bearing so as to form a lubricant film between the plurality of balls and thereby minimize pressure between the balls caused by slipping contact.

14. A ball bearing system as defined in claim 13, wherein said lubricating means lubricates said ball bearing using an oil jet.

15. A ball bearing system as defined in claim 13, wherein the lubricating means lubricates said ball bearing using an oil mist.

16. A ball bearing system as defined in claim 13, wherein the ceramic forming the plurality of balls is selected from the group consisting of silicon nitride, sialon, silicon carbide and alumina.

17. A ball bearing system as defined in claim 13, wherein the raceway of said ball bearing is made of high-speed steel and the plurality of balls are made of silicon nitride.

18. A ball bearing system as defined in claim 13, wherein the ceramic forming the plurality of balls has a density substantially less than that of steel.

19. A ball bearing system as defined in claim 13, wherein the plurality of balls are positioned in the raceway of said ball bearing with a ratio of circumferential clearance to ball diameter in the range of 0.2 to 0.8.

20. A ball bearing system for turbochargers according to claim 13, wherein inner and outer raceway grooves are formed on the inner and outer rings, respectively, and a thickness of the inner ring of said raceway outside of the inner raceway groove is even relative to a longitudinal centerline of the inner ring.

* * * * *